June 4, 1968    J. L. MOSS    3,386,532
PARKING BRAKE FOR USE IN A DRIVELINE
Filed Jan. 5, 1966    4 Sheets-Sheet 2
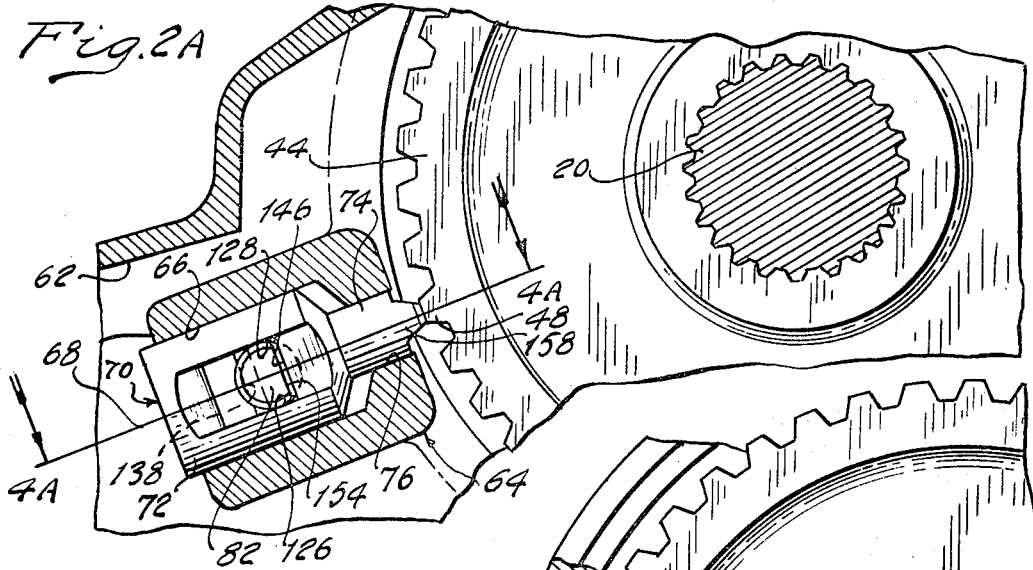
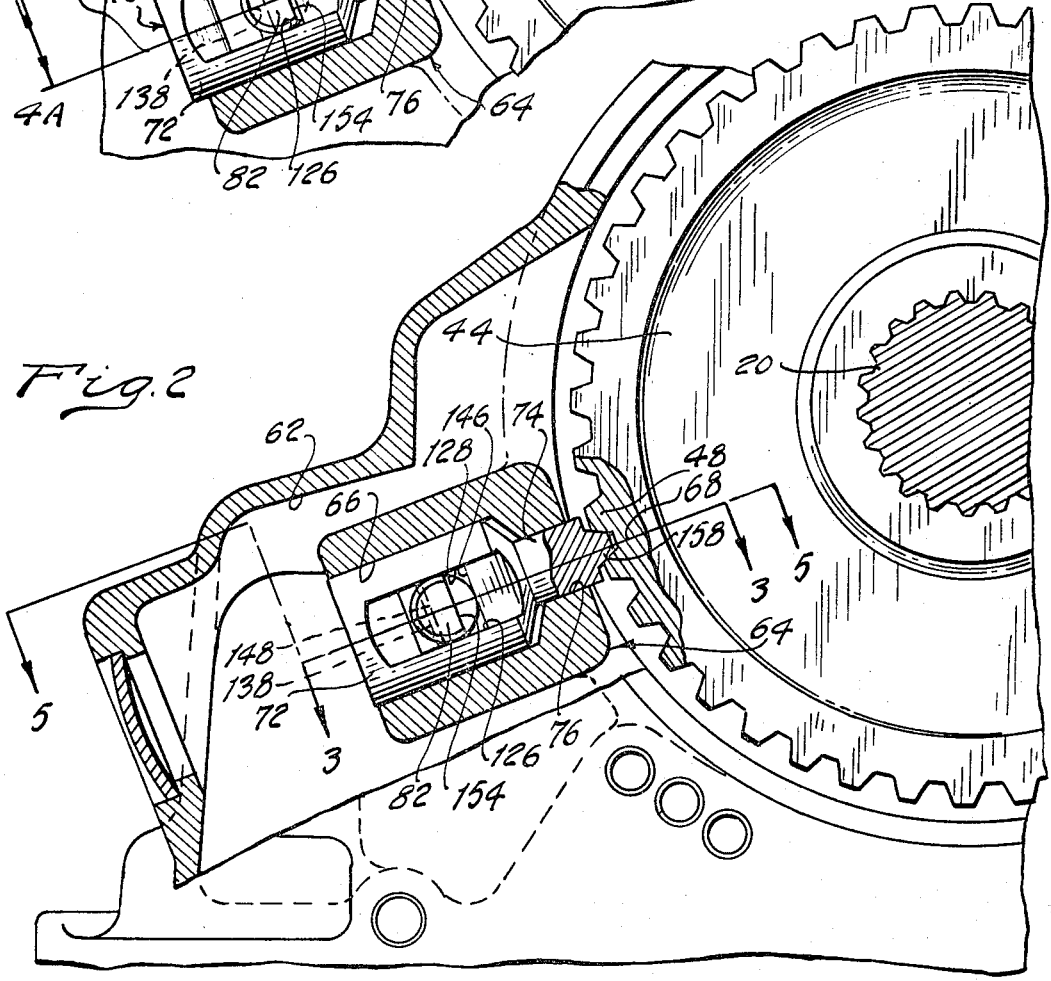
INVENTOR:
JACQUES L. MOSS
BY
ATTORNEYS.

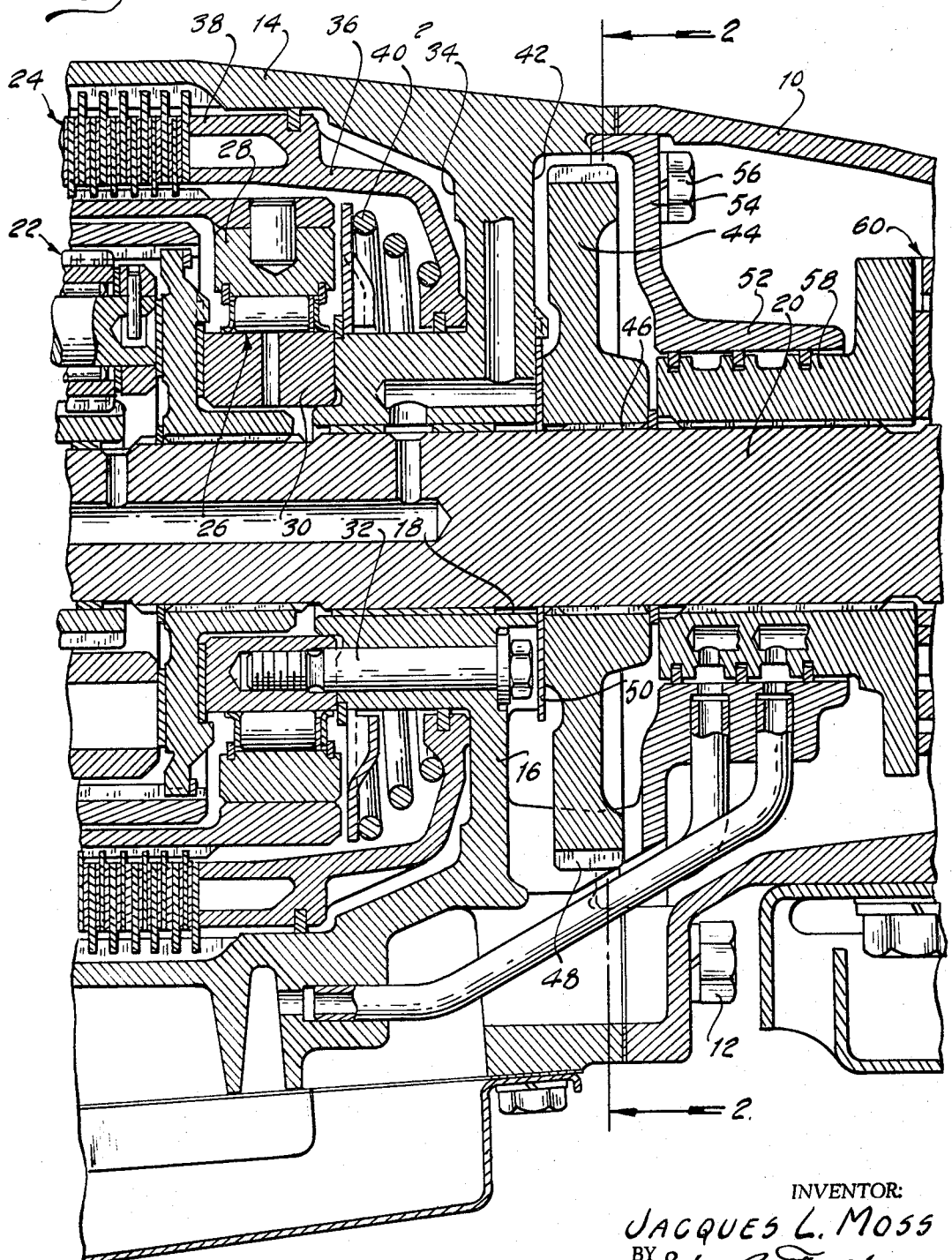

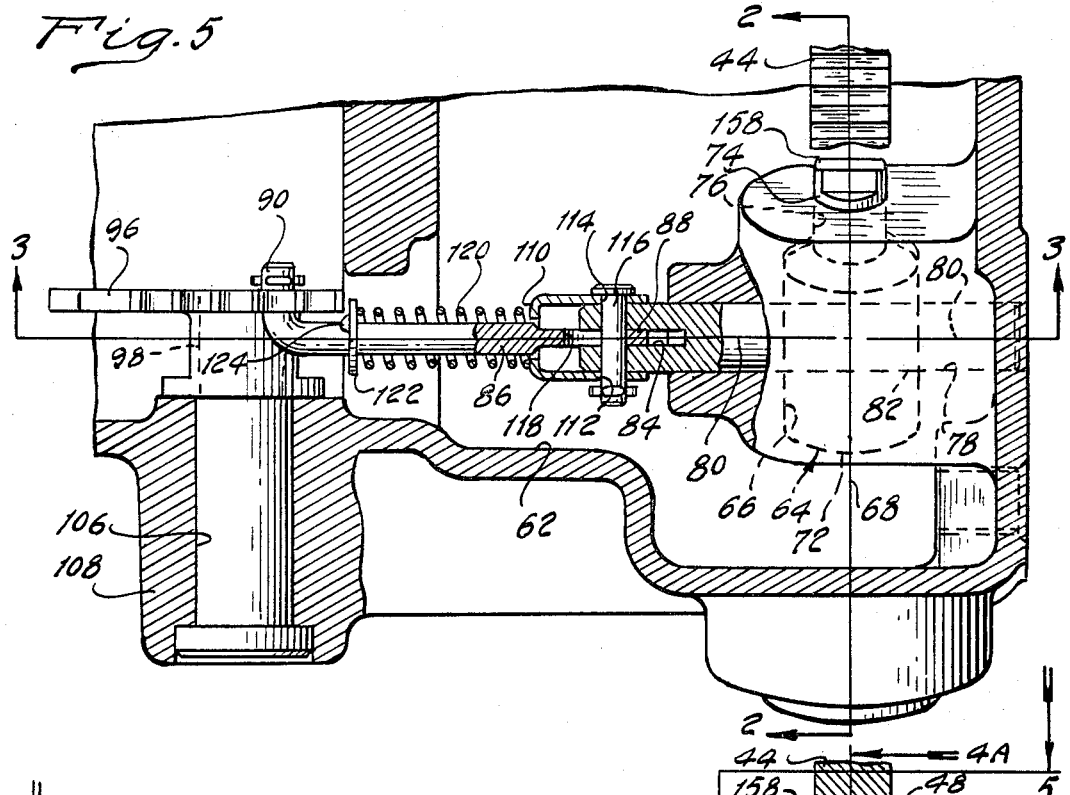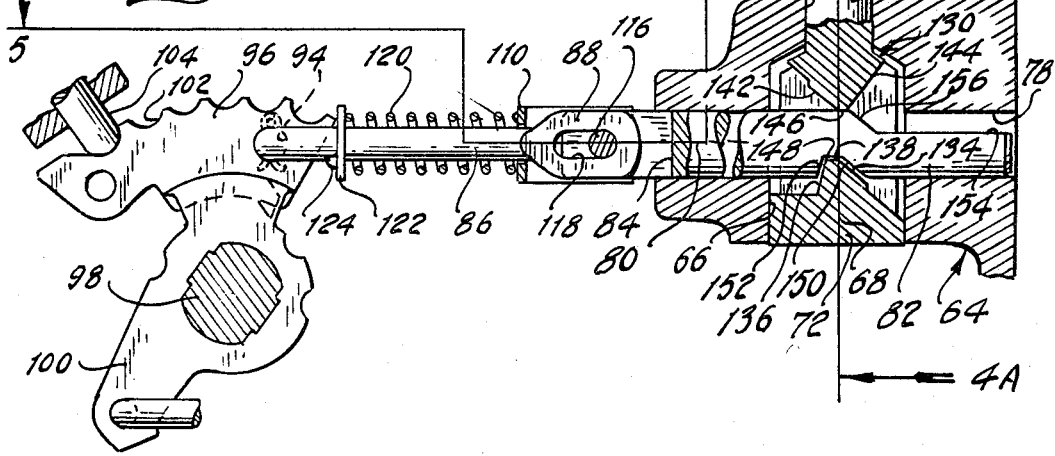

June 4, 1968 J. L. MOSS 3,386,532
PARKING BRAKE FOR USE IN A DRIVELINE
Filed Jan. 5, 1966 4 Sheets-Sheet 4
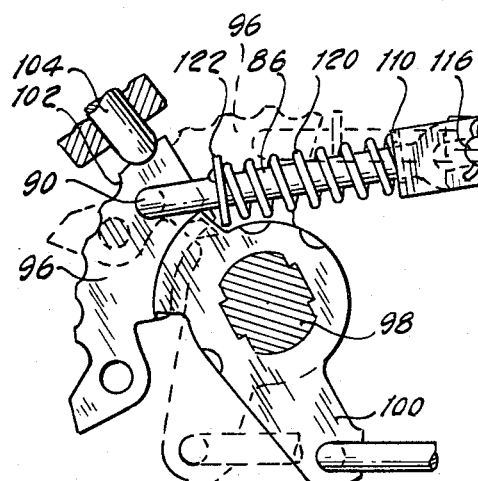
Fig. 4
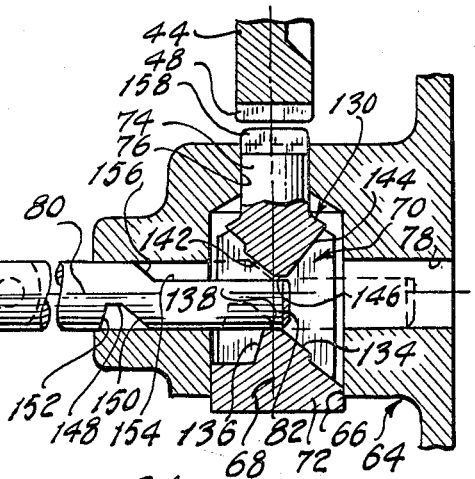
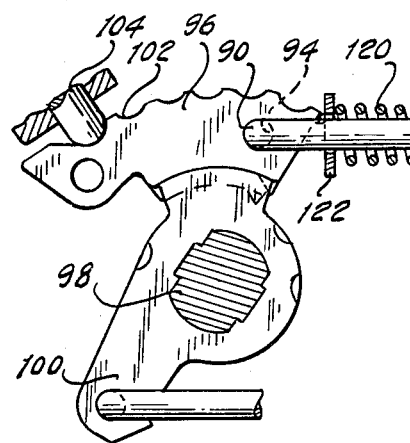
Fig. 4A
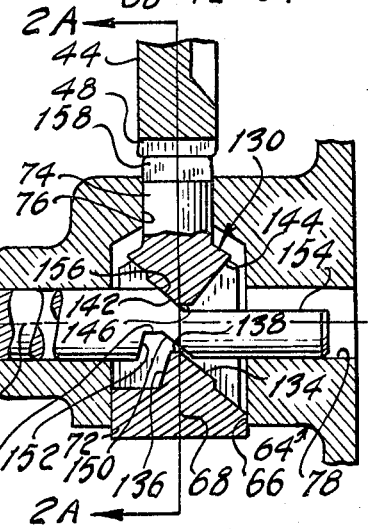
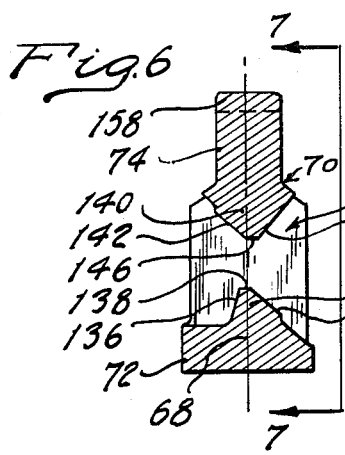
Fig. 6   Fig. 7
INVENTOR:
JACQUES L. MOSS
BY
ATTORNEYS.

United States Patent Office 3,386,532
Patented June 4, 1968

3,386,532
PARKING BRAKE FOR USE IN A DRIVELINE
Jacques L. Moss, Southfield, Mich., assignor to Ford Motor Company, Dearborn, Mich., a corporation of Delaware
Filed Jan. 5, 1966, Ser. No. 518,936
2 Claims. (Cl. 188—31)

ABSTRACT OF THE DISCLOSURE

This specification describes a parking brake mechanism for a transmission power output shaft. The brake includes a parking gear in the shaft and a driver actuated pawl. The pawl establishes a positive locking action both in the brake applying condition and in the brake releasing position.

My invention relates generally to positive action brakes for holding fast a rotary shaft in a torque delivery driveline. It relates more particularly to improvements in a parking brake mechanism for use with a geared power transmission system in a vehicle driveline.

Positive action parking brakes often are used with commercially available, automatic, power transmission mechanisms in vehicle drivelines. These mechanisms may include hydrokinetic units, such as torque converters, and multiple ratio gearing. The motion of the elements of the gearing is controlled by fluid pressure operated clutches and brakes. When the vehicle is parked with the vehicle engine inactive, the clutches and brakes become disengaged thereby rendering the transmission system incapable of establishing a torque delivery connection between the engine and the vehicle traction wheels. If the transmission system includes a hydrokinetic unit, it also may produce an interruption in the torque delivery path. Thus, when the vehicle engine is inactive and the vehicle is at rest, the traction wheels tend to freewheel with respect to the engine. In order to avoid this condition, a parking gear may be splined or keyed to the power output shaft of the gearing. A locking pawl, which is pivoted on the relatively stationary transmission housing, is caused to engage the teeth of the parking gear thereby holding the power output shaft against rotation.

The pawl is controlled by the vehicle operator by means of a parking brake linkage. Usually this forms a part of the linkage system with which the vehicle operator controls the position of the drive range selector valve as the transmission is conditioned for forward drive operation, reverse drive operation or neutral.

The vehicle operator may adjust the parking brake pawl into a position that will allow it to register with the teeth of the parking gear. If the tooth of the pawl and the teeth of the parking gear are out of registry, a lost motion spring connection in the driver control linkage will permit movement of the linkage to the braking position as an associated spring becomes loaded. Upon subsequent movement of the power output shaft, the pawl will snap into registry with the parking gear to establish a locking condition. This is done under the influence of the preload imposed upon the lost motion connection.

The operator may adjust the parking brake linkage to a brake release position. In doing this he conditions the pawl for movement away from the parking gear and out of registry with the parking gear teeth. It is conventional practice in arrangements of this type to rely upon the radial component of the gear tooth contact forces for the parking gear teeth and the pawl tooth to adjust the pawl to a brake release position. It is usual practice also to supplement the disengaging force of the gear tooth reaction with a spring force. The spring force is obtained by means of a spring which acts directly upon the pawl and normally urges it to a release position.

The manual effort required to disengage the pawl in arrangements of this type often is undesirably high. This is true especially if the vehicle is parked on a grade which will impose a torque upon the parking gear. The torque acting on the parking gear increases the friction forces that resist movement of the parking brake linkage elements toward the brake release position. It also has been found that under certain conditions it is possible for the parking brake linkage elements to be adjusted to the brake release position without a corresponding disengaging motion of the parking pawl. This might occur as the parking gear teeth become worn or if the tooth side angle on the parking gear teeth or on the cooperating pawl tooth is such that the radial component of the gear tooth contact forces is not sufficient to effect disengagement of the pawl.

It is an object of my invention to provide a parking brake mechanism for use in a transmission system of the type above set forth and which will avoid the shortcomings in conventional parking brake mechanisms described in the preceding paragraphs.

It is another object of my invention to provide a parking brake mechanism for an automotive vehicle driveline which is characterized by its simplicity in design and its reliability in operation.

It is a further object of my invention to provide a parking brake mechanism characterized by a reduced brake releasing effort and which is characterized further by its reduced space requirements. It thereby is capable of being adapted to any one of a variety of transmission systems where space conservation is essential.

It is a further object of my invention to provide a parking brake mechanism for an automatic power transmission system which is characterized by its ability to be forced to a release position regardless of the magnitude of the braking effort.

Further objects and features of my invention will become readily apparent from the following description and from the accompanying drawings, wherein:

FIGURE 1 shows in partial cross-sectional form, a portion of a power transmission gear system embodying my improved parking brake;

FIGURE 2 is a partial cross-sectional view taken along the plane of section line 2—2 of FIGURE 1;

FIGURE 2A is a view similar to FIGURE 2, but the pawl is shown in engagement with a high point of a parking gear tooth;

FIGURE 3 is a view in partial cross-sectional form taken along the plane of section line 3—3 of FIGURE 2. The pawl as shown in FIGURE 3 is illustrated out of position for purposes of clarity;

FIGURE 4 is a view similar to FIGURE 3 although it shows the pawl in a released position;

FIGURE 4A is a sectional view taken along section line 4A—4A of FIGURE 2A;

FIGURE 5 is a sectional view taken along the plane of section line 5—5 of FIGURE 2 and FIGURE 3;

FIGURE 6 is a detailed sectional view of the movable pawl used with the parking brake mechanism as seen from the plane of section line 6—6 of FIGURE 7; and, FIGURE 7 shows the parking pawl of FIGURE 6 as viewed from the plane of section line 7—7 of FIGURE 6.

In FIGURE 1, numeral 10 designates a tailshaft extension housing for an automotive vehicle power transmission mechanism. It is bolted by means of bolts 12 to the rearward end of a main transmission housing 14, which encloses torque delivery gearing of the transmission system. The housing may be secured at its forward end to the engine block of an internal combustion vehicle engine.

The housing 14 is provided with an end wall 16, which has formed therein a central opening 18 through which power output shaft 20 extends.

The torque delivery path in the transmission system is defined in part by planetary gearing 22. The relative motion of the gearing can be controlled by clutches and brakes to establish the various speed ratios. One such brake is shown at 24. This is complemented by the braking action of an overrunning brake assembly 26.

Brake 26 includes an outer race 28 which is connected directly to a carrier member of the gearing 22. The inner race 30 of the brake 28 is connected by means of bolts 32 to the wall 16.

An annular cylinder 34 is defined by the wall 16. An annular piston 36 is situated within the cylinder 34 in cooperation therewith to define a pressure cavity. The radially outward portion 38 of the piston 36 acts against the brake disc of the friction brake 24 when pressure is admitted to the cylinder 34. Piston 36 normally is urged to a brake releasing position by a piston return spring 40.

The right-hand side of the wall 16 is formed with a recess 42 which receives a parking gear 44. This gear is splined, as shown at 46, to the shaft 20. Its periphery is formed with teeth 48.

A thrust washer 50 is situated between the gear 44 and the wall 16. A sleeve 52, which forms a part of a fluid pressure distributor manifold for an automatic control valve system for the transmission, is formed integrally with a closure member 54. This is bolted by means of bolts 56 to the end wall 16. It provides also an enclosure for the parking gear 44.

Splined to shaft 20 is a governor body 58. It includes a hub extension that is received within the sleeve 52. Body 58 carries a governor valve assembly identified generally by reference character 60. This assembly forms a part of an automatic control valve system.

In FIGURES 2 through 5 there is shown my improved brake structure in varous operating positions in the housing portion 14 adjacent wall 16. The cam and pawl portions of the brake structure are located in a cavity identified generally by reference character 62. Situated in this cavity 62 is a boss 64 carried by the housing 14 as part of a cast assembly. Boss 16 is formed with a cylindrical opening 66 having an axis 68 that extends radially with respect to the axis of shaft 20. Slidably positioned within opening 66 is a pawl generally identified by reference character 70. This pawl is shown more particularly in FIGURES 6 and 7. In general, however, it includes a relatively large diameter portion 72 and a smaller diameter cylindrical portion 74. Portion 72 is slidably positioned within cylindrical opening 66 and portion 74 is slidably positioned in a reduced diameter opening 76, which is axially aligned with opening 66.

An opening 78 extends generally in an axial direction through the boss 64. The axis 80 of the opening 78 may intersect axis 68 of the opening 66. A right angle axis 80 extends generally parallel to the axis of shaft 20.

Slidably positioned within opening 78 is a parking brake actuator rod 82. Rod 82 extends outwardly from the boss 64. The extended end of rod 82 is bifurcated to form an axially extending slot 84. A link 86, which is formed at its end with a reduced thickness to define a flat 88, is slidably received within slot 84. Link 86, at its extended end 90, is formed at a right angle. End 90 is received through an opening 94 formed in a detent plate 96. This plate is carried by a shaft 98 which is mounted for oscillation within a suitable opening 106 formed in a boss 108 on the transmission housing 14. An extension 100 facilitates a connection with a driver controlled range selector rod that may be situated within the vehicle passenger compartment.

The margin of the plate 96 is formed with detent recesses 102 which are adapted to register with a spring loaded detent plunger 104. Each recess 102 cooperates with the plunger 104 to define each of the several drive ranges for a manual valve which in turn controls the drive range for the automatic control valve system.

A spring seat 110 straddles the end of rod 82. It is formed with openings 112 and 114 which receive a retainer pin 116. This pin extends through the end of the rod 82 and also through an elongated opening 118 formed in the end flat 88 of the link 86.

The heel of the retainer 110 is engaged by a preloaded spring 120 situated between the seat 110 and a washer 122. The washer 122 is held axially fast upon a link 86 by staking as shown at 124. The pawl 70 is formed with an opening that extends through the large diameter pawl portion 72. The opening is provided with straight parallel sides 126 and 128, as shown in FIGURE 7. The opening itself is identified generally by reference character 130.

As seen in FIGURES 6 and 7, one extremity of the opening 130 is provided with a cam element 132 having a cam surface 134. It is provided also with an end surface 136. The innermost extremity of the cam element 132 is provided with a flat surface 138.

The lower extremity of the opening 130 is provided with a cam element 140 having a cam surface 142, and an end surface 144. Element 140 is provided at its innermost end with a flat surface 146 which is displaced slidably in an axial direction with respect to the flat surface 138.

Rod 82 is provided with a cam recess 148 having a cam surface 150 and an end surface 152. Rod 82 is formed also with an elongated recess 154 having an end cam surface 156.

The rod 82 is adapted to be received through the opening 130. When it is moved through the opening 78 in a right-hand direction as viewed in FIGURE 3, cam surface 156 engages cam surface 142 thereby tending to urge the pawl 70 toward the gear teeth 48. As this occurs the cam element 132 enters the cam recess 148. During this movement surfaces 136 and 134 are spaced from the surface 152 and 150 of the recess 148. When the rod 82 assumes the position shown in FIGURE 3, the flat surface 146 engages the cylindrical large diameter surface of rod 82. At that time it is impossible for the pawl 70 to be moved away from the gear teeth regardless of the torque that is exerted upon the gear 44. The flat surface 146 of the cam element 140 and the cylindrical, axially disposed surface of the rod 82 form an effective lock and prevent inadvertent release of the parking gear mechanism after it is engaged.

In order to release the parking gear mechanism it merely is necessary for the operator to shift the rod 82 in a left-hand direction as viewed in FIGURE 3. The cylindrical surface of rod 82 then will slide along the flat surface 146 until cam surface 134 engages the cam surface 150. At that time the pawl 70 will be urged away from the gear teeth 48. As the pawl 70 moves away from the gear, the cam element 140 moves within the recess 154. A clearance exists at that time between surfaces 142 and 156.

As indicated in FIGURE 7, the reduced diameter portion 74 of the pawl 70 defines a tooth 158 which is adapted to mesh with the teeth of the parking gear. If the tooth 158 is misaligned with respect to the parking gear teeth 48 as the rod 82 is shifted in a right-hand direction, the spring 120 will yield and the pinion 116 will shift within the elongated opening 118. This permits the plate 96 to be adjusted to the park position. Upon subsequent movement of the power output shaft 20 for the transmission mechanism, the tooth 158 will snap into registry with the space between two adjacent teeth 48 under the influence of the spring 120.

FIGURE 4A shows the compressed position of the spring 120 if the mechanism is moved to the park position while the pawl tooth 158 is out of registry with the parking gear teeth 48.

In FIGURE 4 the pawl 70 is shown in a released position. At that time the flat surface 138 rides over the cylindrical surface of the rod 82. This maintains the pawl in a retracted position whenever the plate 96 is in any position other than the park position.

Engagement and release of the pawl is done with a positive action and with a minimum amount of effort. It is not possible to adjust the parking gear link to a brake release position without a corresponding withdrawal of the pawl 70 from engagement with the parking gear. Reliance upon the gear tooth forces between the tooth 158 and the teeth 48 is not essential to the operation of the pawl 70.

The angularity of the cam surfaces 150 and 156 and the angularity of the cooperating cam surfaces on the pawl itself can be chosen to satisfy any particular structural environment. The force necessary to operate the rod 82 can be varied accordingly. A greater degree of design flexibility then is achieved than that which would be possible with conventional parking brake mechanisms.

Having thus described a preferred embodiment of my invention, what I claim and desire to secure by U.S. Letters Patent is:

1. A parking brake mechanism for anchoring a torque delivery shaft in a power transmission mechanism, said mechanism including a stationary housing, a parking gear fixed to said shaft and adapted to rotate therewith about a common axis, an opening formed in the housing and extending in a direction generally radial with respect to said common axis, a pawl movably mounted in said opening and adapted for reciprocating movement toward and away from said gear, a tooth formed on one end of said pawl which is engageable with said gear, an opening formed in said pawl, an actuator rod extending through said opening in a direction generally transverse to the direction of movement of said pawl, a first cam element formed in said pawl opening having a first cam surface, a second cam surface formed on said rod adjacent said first cam surface, said first and second cam surfaces slidably engaging each other as said rod is shifted in one direction thereby urging said pawl out of engagement with said gear to release said brake mechanism, a third cam surface formed in said pawl opening, a fourth cam surface formed on said rod, said third and fourth cam surfaces being adapted to slidably engage each other as said rod is shifted in the other direction whereby said pawl tooth is urged into meshing engagement with said gear to apply said brake mechanism, said third cam surface being formed by a second cam element extending within said pawl opening, a first flat surface formed on the extremity of said second cam element, said first flat surface engaging the surface of said rod when the latter assumes a brake mechanism applying position thereby preventing release of said brake mechanism, and a second flat surface formed on the extremity of said first cam element, said second flat surface engaging the surface of said rod when the latter assumes a brake mechanism releasing position thereby preventing application of said brake mechanism, the surface of said rod adjacent said fourth cam surface continuously engaging said housing on one side of said pawl to provide a first end support for said cam elements, the surface of said rod adjacent said second cam surface continuously engaging said housing on the other side of said pawl to provide a second end support for said cam elements.

2. The combination set forth in claim 1 wherein each cam element extends toward said rod, the flat surfaces formed on the cam elements lying in the plane that is parallel to the direction of motion of said rod, and a manually operated link extending in a direction generally parallel to the axis of said rod, a lost motion connection between said link and said rod, and spring means for resisting relative movement of said link with respect to said rod as the latter is shifted to a brake mechanism applying position, said spring means yielding to permit relative motion between said link and said rod upon movement of the latter to a brake mechanism applying position when said pawl is misaligned with respect to the teeth of said gear.

References Cited

UNITED STATES PATENTS

| | | | |
|---|---|---|---|
| 839,584 | 12/1905 | Hayford | 188—31 |
| 1,875,096 | 8/1932 | Miller | 188—69 |
| 2,697,363 | 12/1954 | Sheppard | 188—69 |
| 2,875,856 | 3/1959 | Mrlik et al. | 188—69 |
| 3,023,631 | 3/1962 | Curtis | 188—31 X |
| 3,187,846 | 6/1965 | Powell | 188—69 |

MILTON BUCHLER, *Primary Examiner.*

G. E. A. HALVOSA, *Assistant Examiner.*